US012646112B2

(12) United States Patent
Dervovic et al.

(10) Patent No.: US 12,646,112 B2
(45) Date of Patent: Jun. 2, 2026

(54) METHOD AND SYSTEM FOR ELABORATING MODEL CONTEXT BY COMPUTING EXPLANATION-GUIDED MODEL SIMILARITY

(71) Applicant: JPMorgan Chase Bank, N.A., New York, NY (US)

(72) Inventors: Danial Dervovic, London (GB); Freddy Lecue, Mamaroneck, NY (US); Daniele Magazzeni, London (GB); Barney O'Kane, Darien, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 215 days.

(21) Appl. No.: 18/104,661

(22) Filed: Feb. 1, 2023

(65) Prior Publication Data

US 2024/0257239 A1    Aug. 1, 2024

(51) Int. Cl.
*G06Q 40/04* (2012.01)
(52) U.S. Cl.
CPC .................................... *G06Q 40/04* (2013.01)
(58) Field of Classification Search
None
See application file for complete search history.

(56) References Cited

U.S. PATENT DOCUMENTS

| | | | | |
|---|---|---|---|---|
| 2022/0292239 A1* | 9/2022 | Kahraman | ............. | G06N 20/00 |
| 2022/0335315 A1* | 10/2022 | Zonca | .................... | G06N 5/045 |
| 2022/0358594 A1* | 11/2022 | Zhu | ........................ | G06N 3/045 |
| 2023/0217357 A1* | 7/2023 | Rathore | ............... | H04W 24/08 |
| | | | | 370/329 |

* cited by examiner

*Primary Examiner* — Matthew S Gart
*Assistant Examiner* — Liz P Nguyen
(74) *Attorney, Agent, or Firm* — GREENBLUM & BERNSTEIN, P.L.C.

(57) ABSTRACT

Methods and systems for obtaining contextual information about a machine learning model are provided. The method includes: receiving raw data that is usable for training a model; training the by using the raw data; computing a set of common background data based on the raw data; computing a first explanation based on an output of the model and the set of common background data; computing, based on an output of the model, an agnostic model representation of the model; computing, based on the first explanation and the agnostic model representation, a deep, compact, and dense explanation-driven representation of the model; and determining, based on the explanation-driven representation, contextual information that relates to the model.

15 Claims, 4 Drawing Sheets

400

Receive Raw Data

S402

Train Model

S404

Compute Common Background Data

S406

Compute Explanation

S408

Compute Agnostic Model Representation of Model

S410

Compute Deep, Compact, and Dense Explanation-Driven Representation of Model

S412

Determine Contextual Information re Model

S414

METHOD AND SYSTEM FOR ELABORATING MODEL CONTEXT BY COMPUTING EXPLANATION-GUIDED MODEL SIMILARITY

BACKGROUND

1. Field of the Disclosure

This technology generally relates to methods and systems for constructing and maintaining machine learning models, and more particularly to methods and systems for elaborating a context of a machine learning model by computing an explanation-guided model similarity in order to improve quality and accuracy of model outputs.

2. Background Information

Machine learning models are used for performing many tasks for which artificial intelligence (AI) techniques are applicable for obtaining results. Conventionally, historical data relating to a particular task is used for training such a model, and the model may be regularly maintained by providing fresh historical data.

One problem that often occurs with respect to constructing and maintaining a machine learning model involves how to make a determination regarding quality and accuracy of model outputs. Such a determination may be made by understanding a context of use of the model.

Accordingly, there is a need for a method for elaborating a context of a machine learning model by computing an explanation-guided model similarity in order to improve quality and accuracy of model outputs.

SUMMARY

The present disclosure, through one or more of its various aspects, embodiments, and/or specific features or sub-components, provides, inter alia, various systems, servers, devices, methods, media, programs, and platforms for methods and systems for elaborating a context of a machine learning model by computing an explanation-guided model similarity in order to improve quality and accuracy of model outputs.

According to an aspect of the present disclosure, a method for obtaining contextual information about a machine learning model is provided. The method is implemented by at least one processor. The method includes: receiving, by the at least one processor, at least a first set of raw data that is usable for training a first model; training, by the at least one processor, the first model by using the at least the first set of raw data; computing, by the at least one processor, a set of common background data based on the at least the first set of raw data; computing, by the at least one processor, a first explanation based on an output of the first model and the computed set of common background data; computing, by the at least one processor based on an output of the first model, an agnostic model representation of the first model; computing, by the at least one processor based on the first explanation and the agnostic model representation, an explanation-driven representation of the first model; and determining, by the at least one processor based on the explanation-driven representation, contextual information that relates to the first model.

The contextual information may include a similarity score that relates to a degree of similarity between the first model and a target model that is generated by using current output data from the first model.

The contextual information may include a textual message that includes a second explanation that relates to the first set of raw data.

The contextual information may further include a time frame that relates to the first set of raw data.

The first set of raw data may include bond pricing data that relates to a first bond. The first model may be configured to generate a projected price of the first bond at a particular time.

The first model may include at least one from among a tree-based model, a neural network model, and a linear model.

The first explanation may include a first plurality of features that relate to the first model and, for each respective feature from among the first plurality of features, a corresponding ranking value.

The computing of the first explanation may include applying at least one from among a Shapley Additive explanations (SHAP) technique and a features attribution technique to each feature from among the first plurality of features.

The first model may be associated with a weight pairing for which a first weight relates to an explanation feature associated with the first model, a second weight relates to a model feature associated with the first model, and a sum of the first weight and the second weight is equal to 1.0.

According to another exemplary embodiment, a computing apparatus for obtaining contextual information about a machine learning model is provided. The computing apparatus includes a processor; a memory; and a communication interface coupled to each of the processor and the memory. The processor is configured to: receive, via the communication interface, at least a first set of raw data that is usable for training a first model; train the first model by using the at least the first set of raw data; compute a set of common background data based on the at least the first set of raw data; compute a first explanation based on an output of the first model and the computed set of common background data; compute an agnostic model representation of the first model; compute, based on the first explanation and the agnostic model representation, an explanation-driven representation of the first model; and determine, based on deep explanation-driven representation, contextual information that relates to the first model.

The contextual information may include a similarity score that relates to a degree of similarity between the first model and a target model that is generated by using current output data from the first model.

The contextual information may include a textual message that includes a second explanation that relates to the first set of raw data.

The contextual information may further include a time frame that relates to the first set of raw data.

The first set of raw data may include bond pricing data that relates to a first bond. The first model may be configured to generate a projected price of the first bond at a particular time.

The first model may include at least one from among a tree-based model, a neural network model, and a linear model.

The first explanation may include a first plurality of features that relate to the first model and, for each respective feature from among the first plurality of features, a corresponding ranking value.

The processor may be further configured to compute the first explanation by applying at least one from among a Shapley Additive explanations (SHAP) technique and a features attribution technique to each feature from among the first plurality of features.

The first model may be associated with a weight pairing for which a first weight relates to an explanation feature associated with the first model, a second weight relates to a model feature associated with the first model, and a sum of the first weight and the second weight is equal to 1.0.

According to yet another exemplary embodiment, a non-transitory computer readable storage medium storing instructions for obtaining contextual information about a machine learning model is provided. The storage medium includes executable code which, when executed by a processor, causes the processor to: receive at least a first set of raw data that is usable for training a first model; train the first model by using the at least the first set of raw data; compute a set of common background data based on the at least the first set of raw data; compute a first explanation based on an output of the first model and the computed set of common background data; compute, based on an output of the first model, an agnostic model representation of the first model; compute, based on the first explanation and the agnostic model representation, an explanation-driven representation of the first model; and determine, based on deep explanation-driven representation, contextual information that relates to the first model.

The contextual information may include a similarity score that relates to a degree of similarity between the first model and a target model that is generated by using current output data from the first model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
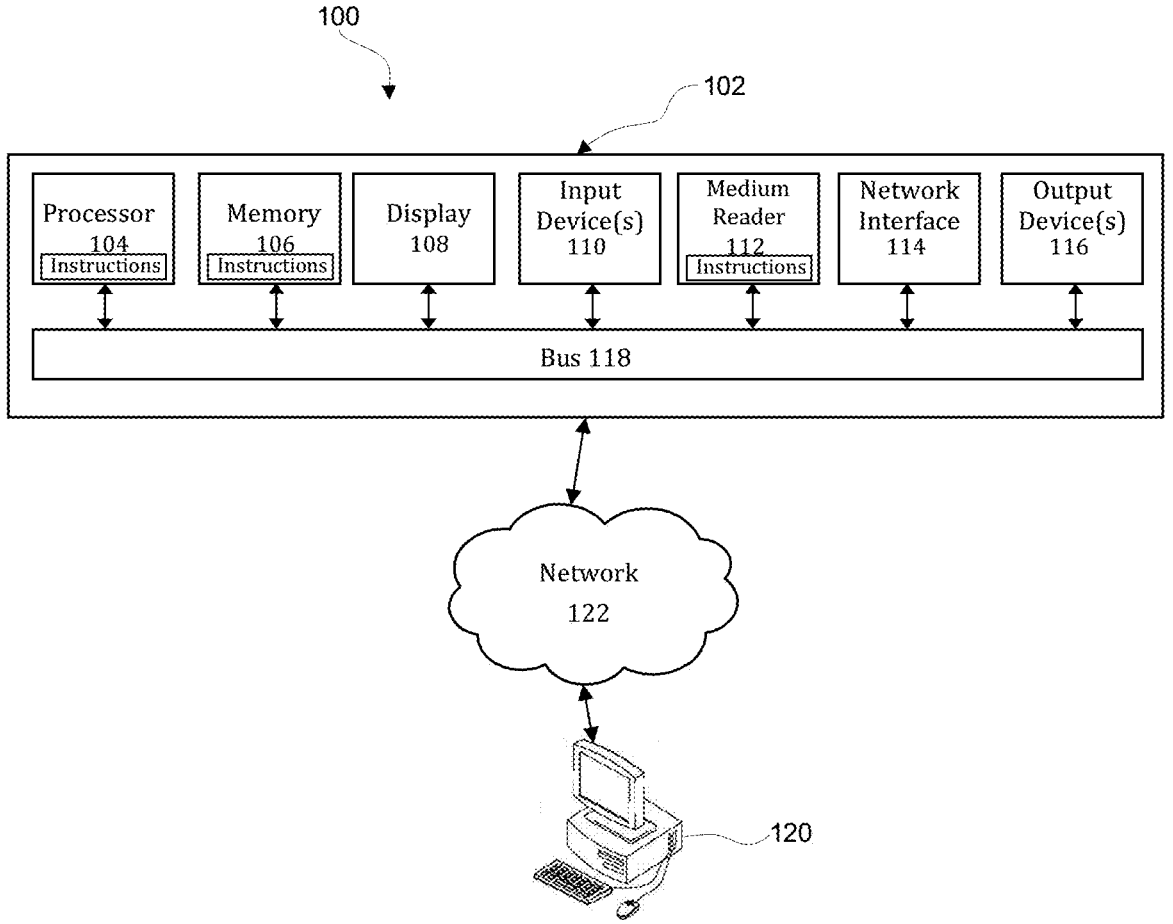
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for elaborating a context of a machine learning model by computing an explanation-guided model similarity in order to improve quality and accuracy of model outputs.

Figure 2:
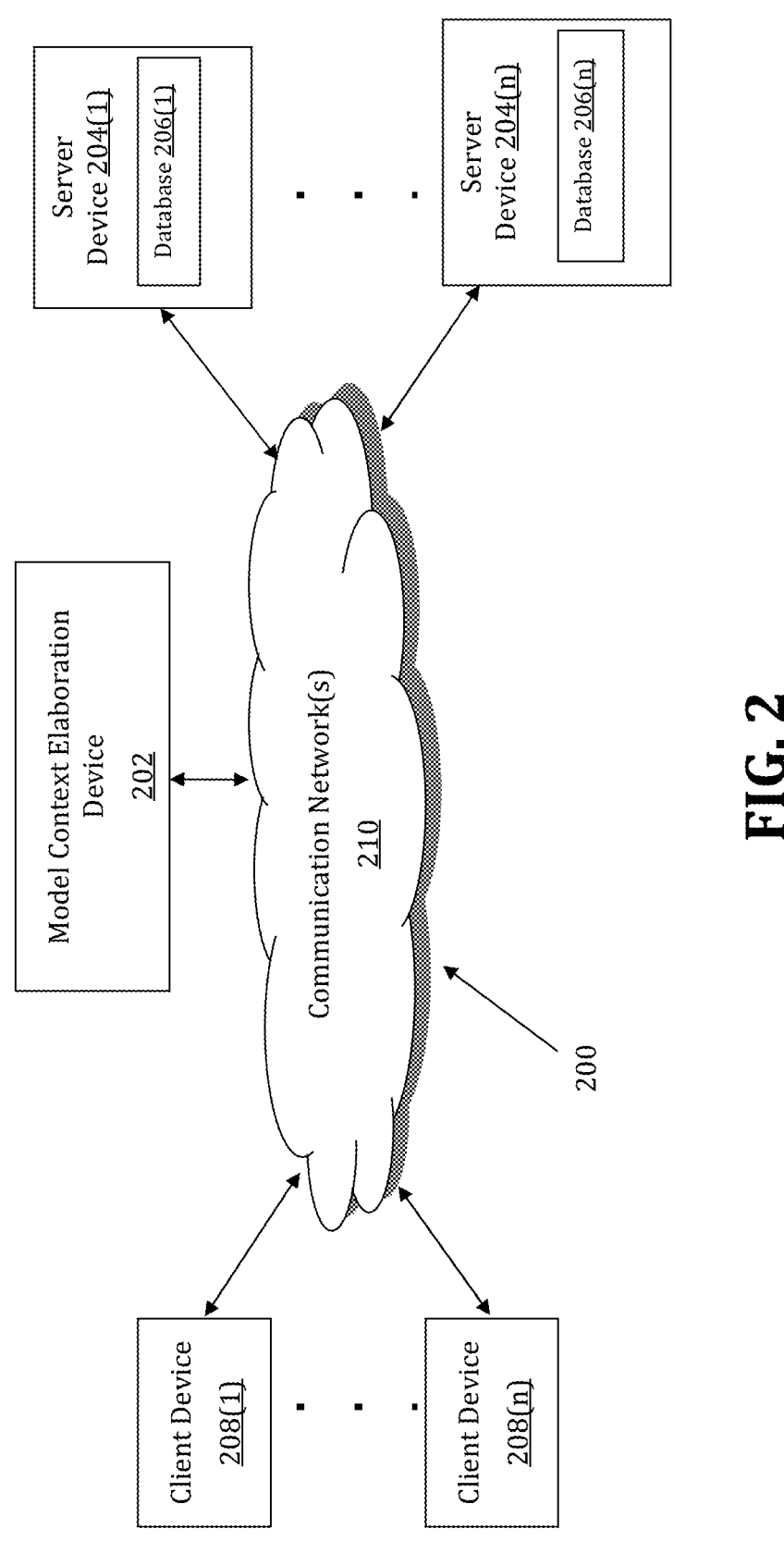
FIG. 2 illustrates an exemplary diagram of a network environment.

Referring to FIG. 2, a schematic of an exemplary network environment 200 for implementing a method for elaborating a context of a machine learning model by computing an explanation-guided model similarity in order to improve quality and accuracy of model outputs is illustrated. In an exemplary embodiment, the method is executable on any networked computer platform, such as, for example, a personal computer (PC).

The method for elaborating a context of a machine learning model by computing an explanation-guided model similarity in order to improve quality and accuracy of model outputs may be implemented by a Model Context Elaboration (MCE) device 202. The MCE device 202 may be the same or similar to the computer system 102 as described with respect to FIG. 1. The MCE device 202 may store one or more applications that can include executable instructions that, when executed by the MCE device 202, cause the MCE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MCE device 202 itself, may be located in virtual server(s) running in a cloud-based computing environment rather than being tied to one or more specific physical network computing devices. Also, the application(s) may be running in one or more virtual machines (VMs) executing on the MCE device 202. Additionally, in one or more embodiments of this technology, virtual machine(s) running on the MCE device 202 may be managed or supervised by a hypervisor.

In the network environment 200 of FIG. 2, the MCE device 202 is coupled to a plurality of server devices 204(1)-204(n) that hosts a plurality of databases 206(1)-206(n), and also to a plurality of client devices 208(1)-208(n) via communication network(s) 210. A communication interface of the MCE device 202, such as the network interface 114 of the computer system 102 of FIG. 1, operatively couples and communicates between the MCE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MCE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MCE devices that efficiently implement a method for elaborating a context of a machine learning model by computing an explanation-guided model similarity in order to improve quality and accuracy of model outputs.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MCE device 202 may be a standalone device or integrated with one or more other devices or apparatuses, such as one or more of the server devices 204(1)-204(n), for example. In one particular example, the MCE device 202 may include or be hosted by one of the server devices 204(1)-204(n), and other arrangements are also possible. Moreover, one or more of the devices of the MCE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MCE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to historical model outputs and information that relates to model-specific contexts.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the MCE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MCE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MCE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MCE device 202, the server devices 204(1)-204(n), or the client devices 208(1)-208(n), for example, may be configured to operate as virtual instances on the same physical machine. In other words, one or more of the MCE device 202, the server devices 204(1)-204(n), or the client devices 208(1)-208(n) may operate on the same physical device rather than as separate devices communicating through communication network(s) 210. Additionally, there may be more or fewer MCE devices 202, server devices 204(1)-204(n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
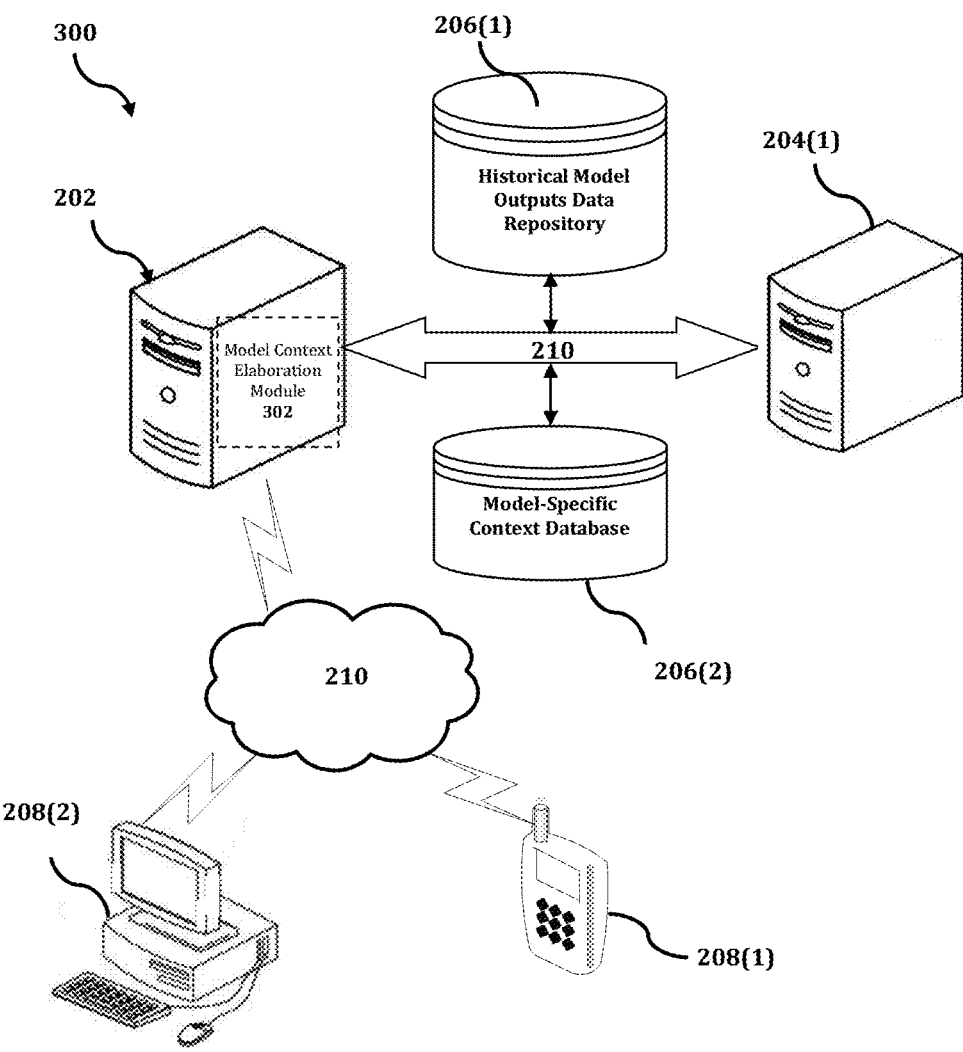
FIG. 3 shows an exemplary system for implementing a method for elaborating a context of a machine learning model by computing an explanation-guided model similarity in order to improve quality and accuracy of model outputs.

The MCE device 202 is described and illustrated in FIG. 3 as including a model context elaboration module 302, although it may include other rules, policies, modules, databases, or applications, for example. As will be described below, the model context elaboration module 302 is configured to implement a method for elaborating a context of a machine learning model by computing an explanation-guided model similarity in order to improve quality and accuracy of model outputs.

An exemplary process 300 for implementing a mechanism for elaborating a context of a machine learning model by computing an explanation-guided model similarity in order to improve quality and accuracy of model outputs by utilizing the network environment of FIG. 2 is illustrated as being executed in FIG. 3. Specifically, a first client device 208(1) and a second client device 208(2) are illustrated as being in communication with MCE device 202. In this regard, the first client device 208(1) and the second client device 208(2) may be "clients" of the MCE device 202 and are described herein as such. Nevertheless, it is to be known and understood that the first client device 208(1) and/or the second client device 208(2) need not necessarily be "clients" of the MCE device 202, or any entity described in association therewith herein. Any additional or alternative relationship may exist between either or both of the first client device 208(1) and the second client device 208(2) and the MCE device 202, or no relationship may exist.

Further, MCE device 202 is illustrated as being able to access a historical model outputs data repository 206(1) and a model-specific context database 206(2). The model context elaboration module 302 may be configured to access these databases for implementing a method for elaborating a context of a machine learning model by computing an explanation-guided model similarity in order to improve quality and accuracy of model outputs.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MCE device 202 via broadband or cellular communication. Of course, these embodiments are merely exemplary and are not limiting or exhaustive.

Upon being started, the model context elaboration module 302 executes a process for elaborating a context of a machine learning model by computing an explanation-guided model similarity in order to improve quality and accuracy of model outputs. An exemplary process for elaborating a context of a machine learning model by computing an explanation-guided model similarity in order to improve quality and accuracy of model outputs is generally indicated at flowchart 400 in FIG. 4.

Figure 4:
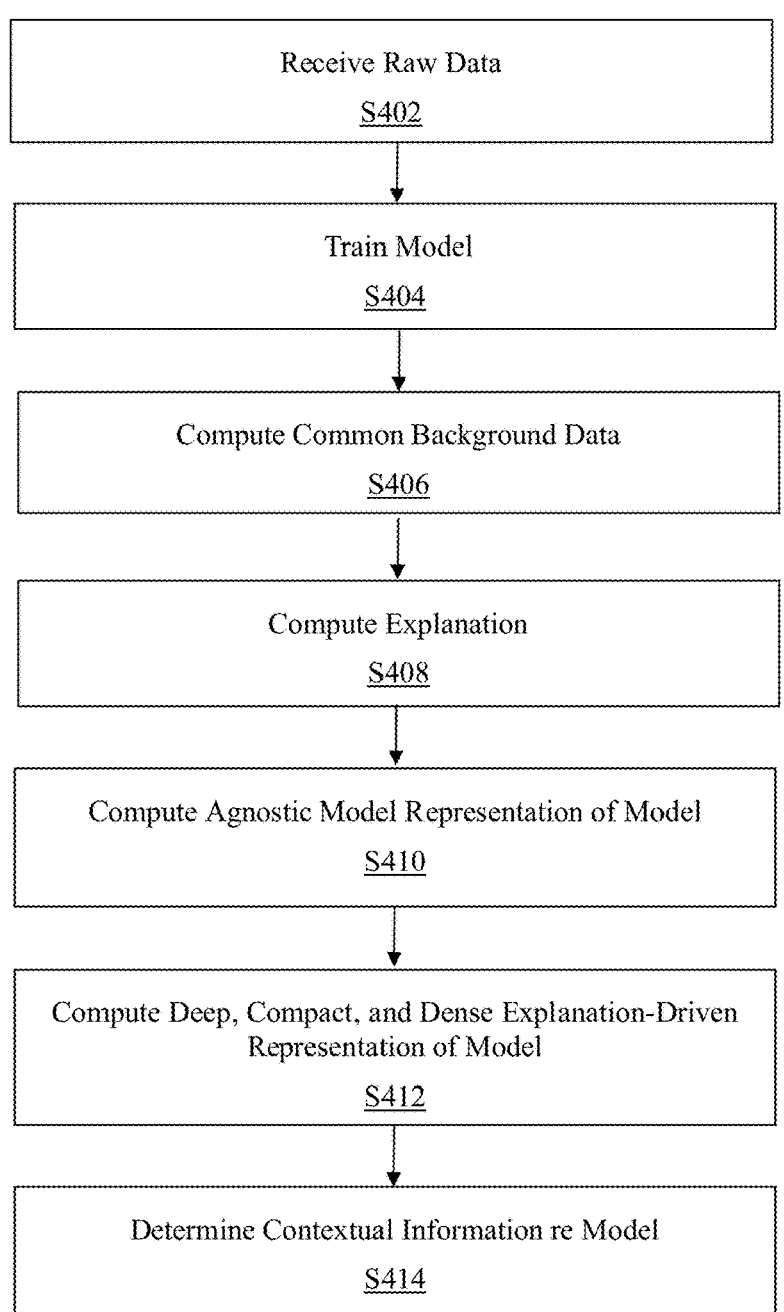
FIG. 4 is a flowchart of an exemplary process for implementing a method for elaborating a context of a machine learning model by computing an explanation-guided model similarity in order to improve quality and accuracy of model outputs.

In process 400 of FIG. 4, at step S402, the model context elaboration module 302 receives at least one set of raw data that relates to a quantity that varies with respect to time and is related to a machine learning model that is configured to project future values of the quantity. In an exemplary embodiment, the model may be configured to project bond pricing values for a particular type of financial bond, and the raw data may include a set of bond pricing values that occurred during a particular time interval. For example, a first set of raw data may include bond pricing data from January 2020 that is deemed as being "pre-COVID-19 pandemic" bond pricing data, and a second set of raw data may include bond pricing data from Autumn 2022 that is deemed as coinciding with a "USA Bear Market." In addition, one set of raw data corresponds to a target model that includes both future bond pricing data, which does not yet exist, and relatively recent bond pricing data.

At step S404, the model context elaboration module 302 trains the machine learning model by using the raw data received in step S402. In an exemplary embodiment, the model may include any one or more of a tree-based model, a neural network model, and/or a linear model. In an exemplary embodiment, the model may be trained separately for each set of raw data that is provided as an input in step S402.

At step S406, the model context elaboration module 302 performs a minimal common background data computation with respect to all of the raw data sets received in step S402. In an exemplary embodiment, the minimal common background data set may be computed on a data-point-by-data-point basis, as follows: First, any data point that is included in all of the raw data sets is automatically included in the set of common background data. In addition, a threshold maximum distance is selected, and then, for any point P1 that is included in the first set of raw data and for which there exists a point P2 in a second set of raw data and a point Pn in an nth set of raw data such that the respective distances between P1 and P2 and P1 and Pn are less than the threshold maximum distance, P1 is also included in the set of common background data.

At step S408, the model context elaboration module 302 computes an explanation with respect to each machine learning model, based on the minimal set of common background data. In an exemplary embodiment, the explanation includes an attribution of features that are characteristic of the corresponding model, and the attribution of features includes an identification of each respective feature and a ranking value that corresponds to the respective feature. For a tree-based model, the explanation may include a tree path that corresponds to the model. In an exemplary embodiment, the computation of the explanation may be performed by applying a SHapley Additive explanations (SHAP) technique to each feature associated with the model. Alternatively, the computation of the explanation may be performed by applying a features attribution technique to each feature associated with the model.

At step S410, the model context elaboration module 302 computes an agnostic model representation for each model. The purpose of the agnostic model representation is to effectuate a numerical representation of each model that has a similar format in order to facilitate an ability to directly compare models with each other in a common vectorial space. In an exemplary embodiment, the neural network type of model may be used for the agnostic model representation, and thus, for any other type of model, such as the tree-based model and/or the linear model, a surrogate model that uses the neural network model approach is generated so as to mimic the original version of the model. In an exemplary embodiment, the model context elaboration module 302 returns the features of the dense layer of each model, such as, for example, the n−1/n−2 layer, in the surrogate models as a list.

At step S412, the model context elaboration module 302 computes an explanation-driven representation, such as, for example, a deep, compact, and dense explanation-driven representation, of each model based on the respective explanations computed in step S408 and the agnostic model representations computed in step S410. In an exemplary embodiment, the objective of the deep, compact, and dense explanation-driven representation is to compute a unique latent-space representation of each model based on weighted models and explanations. In this aspect, each model may be associated with a weight pairing for which a first weight relates to an explanation feature of the model, a second weight relates to a model feature, and a sum of the first weight and the second weight is equal to 1.0. For example, the explanation feature of the model may be assigned a first weight (i.e., W1) of 0.9, and the model feature of the model may be assigned a second weight (i.e., W2) of 0.1.

In an exemplary embodiment, the computation of the deep, compact, and dense explanation-driven representation may be performed in accordance with the following: First, stack values of the model and corresponding explanations are assembled in a multi-dimensional array. Second, the explanation features are weighted with the first weight W1 and the model features are weighted with the second weight W2. Third, an auto-encoder neural network architecture that fits the data is generated. Fourth, the auto-encoder neural network architecture is trained by using the data assembled in the multi-dimensional array in order to learn to reproduce that same data. Fifth, the features of the dense layer are returned in the architecture. The result of this procedure is a deep dense representation of each model, represented as a multi-dimensional array.

At step S414, the model context elaboration module 302 determines contextual information that relates to each model. In an exemplary embodiment, the contextual information includes at least three items: 1) a similarity score that relates to a degree of similarity between the respective model and the target model; 2) a textual message that includes an explanation that relates to the raw data set that corresponds to the respective model; and 3) a time frame that relates to the corresponding raw data set.

In an exemplary embodiment, the determination of the contextual information is performed by executing the following procedure: First, for each respective model, a similarity score between the explanation-driven representation of the respective model and the explanation-driven representation of the target model is computed. Second, after all of the similarity scores are computed, the similarity score having the highest value is selected, and the model that is associated with the selected similarity score is used for obtaining the context. For example, if the model for which the raw data indicates "USA Bear Market" and "Autumn 2022" is the same model as the one for which the similarity score is highest with respect to the target model, then the obtained context includes the "USA Bear Market" and "Autumn 2022" indicators.

Accordingly, with this technology, an optimized process for elaborating a context of a machine learning model by computing an explanation-guided model similarity in order to improve quality and accuracy of model outputs is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method being implemented by at least one processor, the method comprising:

receiving, by the at least one processor, at least first and second sets of raw data that are usable for training a first model;

training, by the at least one processor, the first model by using the at least the first and second sets of raw data;

computing, by the at least one processor, a set of common background data based on the at least the first and second sets of raw data, comprising:

including within the set of common background data any data point that appears in both the first and second sets of raw data; and including any point P1 within the first set of raw data for which there exists a point P2 in the second set of raw data such that a distance between P1 and P2 is less than a predetermined threshold maximum distance;

computing, by the at least one processor, a first explanation based on an output of the first model and the computed set of common background data;

computing, by the at least one processor based on an output of the first model, an agnostic model representation of the first model comprising creating a neural network model that mimics the first model;

computing, by the at least one processor based on the first explanation and the agnostic model representation, an explanation-driven representation of the first model; and determining, by the at least one processor based on the explanation-driven representation, contextual information that relates to the first model;

wherein the first model is associated with a weight pairing for which a first weight relates to an explanation feature associated with the first model, a second weight relates to a model feature associated with the first model, and a sum of the first weight and the second weight is equal to 1.0;

wherein the computing an explanation-driven representation of the first model comprises:

assembling stack values of the first model and the first explanation in a multi-dimensional array;

generating an auto-encoder neural network architecture;

training the auto-encoder neural network architecture using data assembled in the multi-dimensional array to learn to reproduce the assembled data;

returning features of a dense layer of the first model in the auto-encoder neural network architecture.

2. The method of claim 1, wherein the contextual information includes a similarity score that relates to a degree of similarity between the first model and a target model that is generated by using current output data from the first model.

3. The method of claim 1, wherein the contextual information includes a textual message that includes a second explanation that relates to the first set of raw data.

4. The method of claim 3, wherein the contextual information further includes a time frame that relates to the first set of raw data.

5. The method of claim 1, wherein the first set of raw data comprises bond pricing data that relates to a first bond, and wherein the first model is configured to generate a projected price of the first bond at a particular time.

6. The method of claim 1, wherein the first explanation comprises a first plurality of features that relate to the first model and, for each respective feature from among the first plurality of features, a corresponding ranking value.

7. The method of claim 6, wherein the computing of the first explanation comprises applying at least one from among a Shapley Additive explanations (SHAP) technique and a features attribution technique to each feature from among the first plurality of features.

8. A computing apparatus, comprising:

a processor;

a memory; and a communication interface coupled to each of the processor and the memory, wherein the processor is configured to:

receive, via the communication interface, at least first and second sets of raw data that are usable for training a first model;

train the first model by using the at least first and second sets of raw data;

compute a set of common background data based on the at least first and second sets of raw data, comprising:

include within the set of common background data any data point that appears in both the first and second sets of raw data; and include any point P1 within the first set of raw data for which there exists a point P2 in the second set of raw data such that a distance between P1 and P2 is less than a predetermined threshold maximum distance;

compute a first explanation based on an output of the first model and the computed set of common background data;

compute an agnostic model representation of the first model comprising creating a neural network model that mimics the first model;

compute, based on the first explanation and the agnostic model representation, an explanation-driven representation of the first model; and determine, based on the explanation-driven representation, contextual information that relates to the first model;

wherein the first model is associated with a weight pairing for which a first weight relates to an explanation feature associated with the first model, a second weight relates to a model feature associated with the first model, and a sum of the first weight and the second weight is equal to 1.0;

wherein the computing an explanation-driven representation of the first model comprises:

assembling stack values of the first model and the first explanation in a multi-dimensional array;

generating an auto-encoder neural network architecture;

training the auto-encoder neural network architecture using data assembled in the multi-dimensional array to learn to reproduce the assembled data;

returning features of a dense layer of the first model in the auto-encoder neural network architecture.

9. The computing apparatus of claim 8, wherein the contextual information includes a similarity score that relates to a degree of similarity between the first model and a target model that is generated by using current output data from the first model.

10. The computing apparatus of claim 8, wherein the contextual information includes a textual message that includes a second explanation that relates to the first set of raw data.

11. The computing apparatus of claim 10, wherein the contextual information further includes a time frame that relates to the first set of raw data.

12. The computing apparatus of claim 8, wherein the first set of raw data comprises bond pricing data that relates to a first bond, and wherein the first model is configured to generate a projected price of the first bond at a particular time.

13. The computing apparatus of claim 8, wherein the first explanation comprises a first plurality of features that relate to the first model and, for each respective feature from among the first plurality of features, a corresponding ranking value.

14. The computing apparatus of claim 13, wherein the processor is further configured to compute the first explanation by applying at least one from among a Shapley Additive explanations (SHAP) technique and a features attribution technique to each feature from among the first plurality of features.

15. A non-transitory computer readable storage medium storing instructions which, when executed by a processor, causes the processor to:

receive at least a first and second sets of raw data that are usable for training a first model;

train the first model by using the at least the first and second sets of raw data;

compute a set of common background data based on the at least first and second sets of raw data, comprising:

include within the set of common background data any data point that appears in both the first and second sets of raw data; and include any point P1 within the first set of raw data for which there exists a point P2 in the second set of raw data such that a distance between P1 and P2 is less than a predetermined threshold maximum distance;

compute a first explanation based on an output of the first model and the computed set of common background data;

compute, based on an output of the first model, an agnostic model representation of the first model comprising creating a neural network model that mimics the first model;

compute, based on the first explanation and the agnostic model representation, an explanation-driven representation of the first model; and determine, based on deep explanation-driven representation, contextual information that relates to the first model;

wherein the first model is associated with a weight pairing for which a first weight relates to an explanation feature associated with the first model, a second weight relates to a model feature associated with the first model, and a sum of the first weight and the second weight is equal to 1.0;

wherein the computing an explanation-driven representation of the first model comprises:

assembling stack values of the first model and the first explanation in a multi-dimensional array;

generating an auto-encoder neural network architecture;

training the auto-encoder neural network architecture using data assembled in the multi-dimensional array to learn to reproduce the assembled data;

returning features of a dense layer of the first model in the auto-encoder neural network architecture.

\* \* \* \* \*